Aug. 18, 1936.　　　K. J. STRIGL　　　2,051,187
TRANSMISSION MECHANISM
Filed July 21, 1934　　2 Sheets-Sheet 2
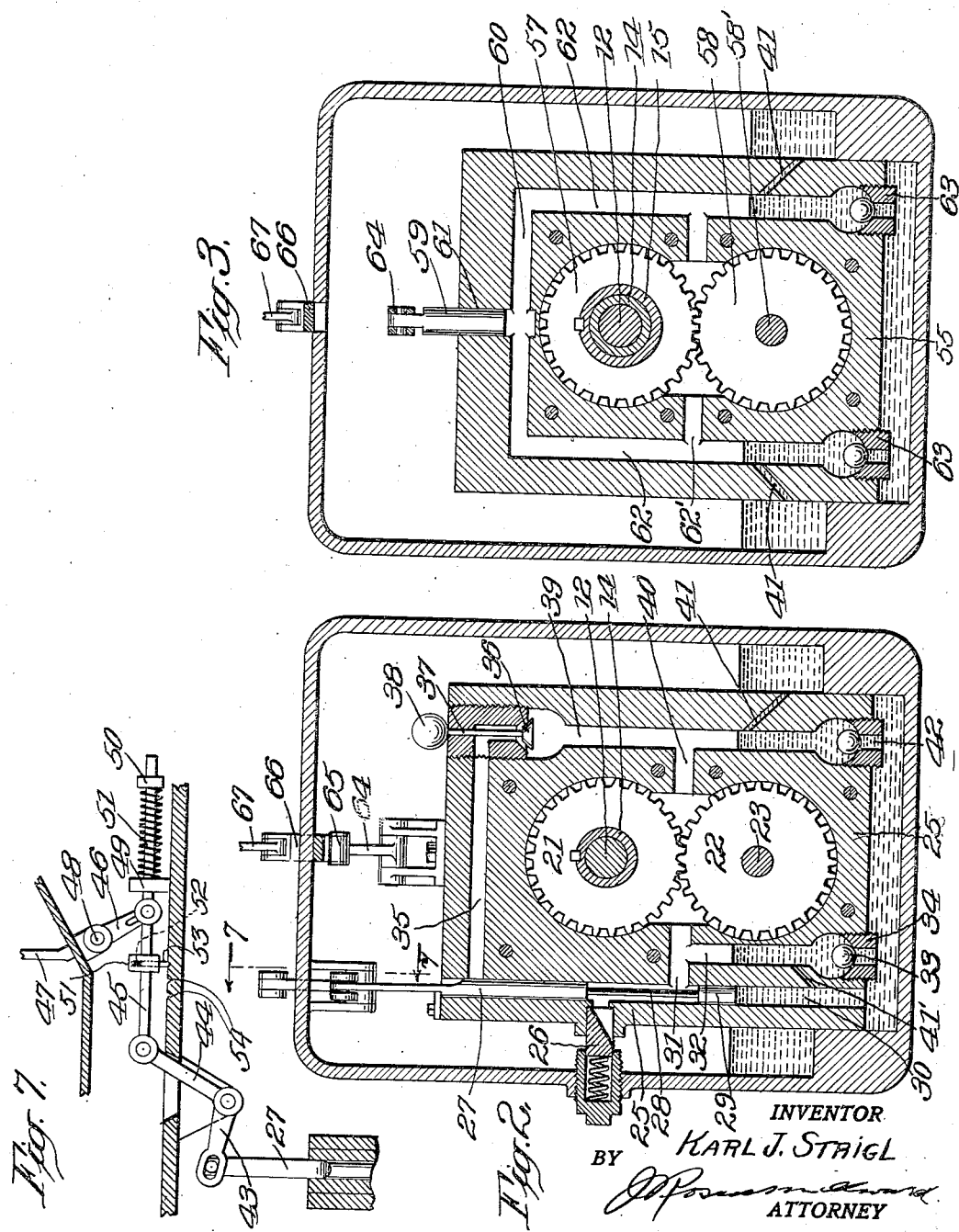
INVENTOR
Karl J. Strigl
BY
ATTORNEY Patented Aug. 18, 1936

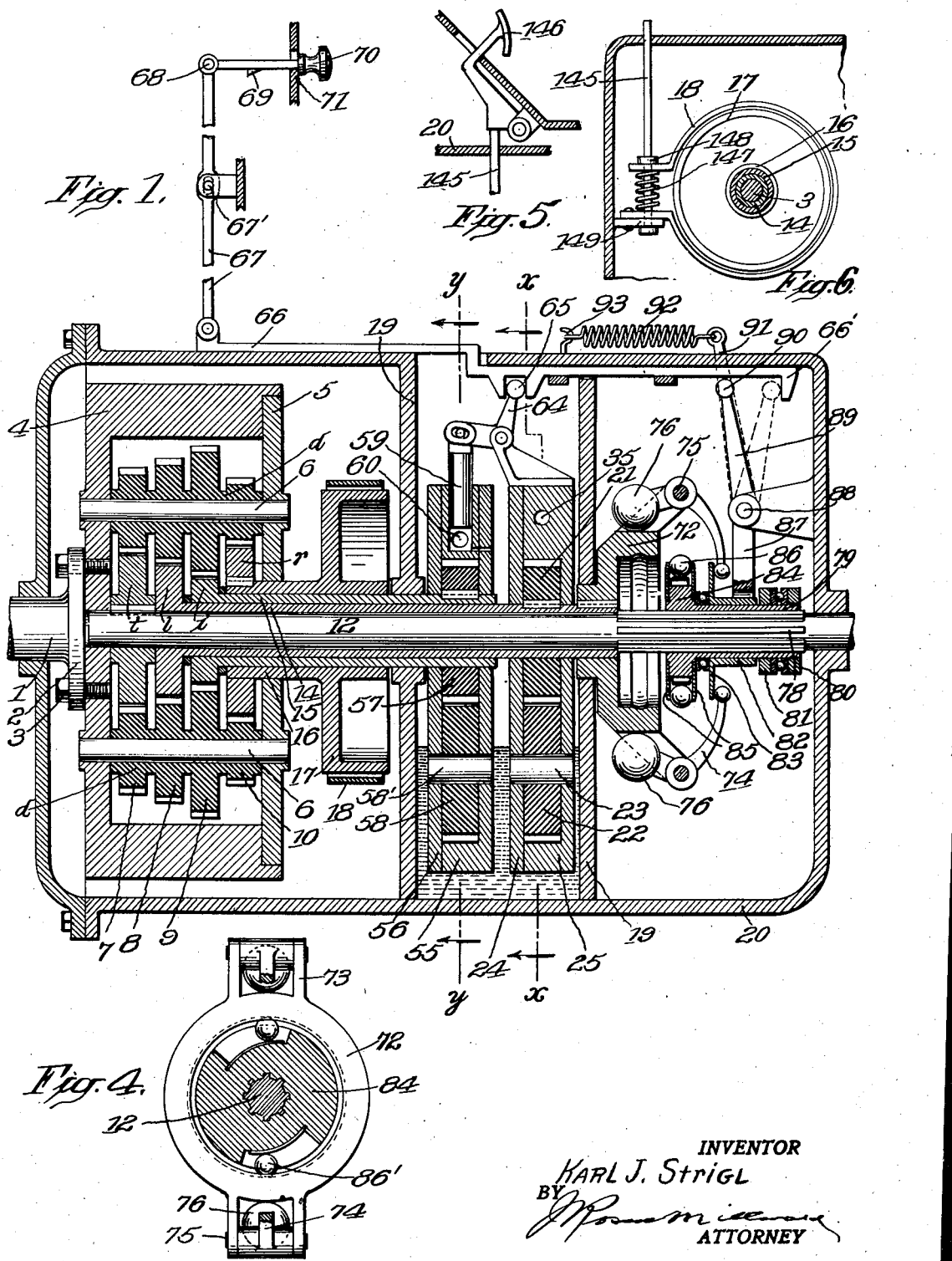

2,051,187

UNITED STATES PATENT OFFICE 2,051,187

TRANSMISSION MECHANISM

Karl Josef Strigl, Astoria, N. Y.

Application July 21, 1934, Serial No. 736,325

10 Claims. (Cl. 74—293)

My present invention relates to transmission mechanisms particularly adapted for automobiles and consists of a novel transmission of improved design and structural arrangement having an improved principle of operation and possessing structural and operating advantages over the present types of transmissions for motor vehicle operation.

The general object of the present improvements is to provide a simplified, variable speed transmission mechanism adapted to be semi-automatic in its action with the elimination of the customarily employed manually operated clutch of standard transmissions while effecting the change of gear under the control of the operator by manipulation of the accelerator pedal in the manner generally similar to that disclosed in my prior Patent No. 1,892,021 of Dec. 27th, 1932.

Further important objects of the present invention include the production of a simplified transmission which in operation will automatically assume neutral driving relation under conditions of the motor operating at idling speed; to provide the foregoing by an improved gearing arrangement employing an epicycle driving gear member driven by the motor and connected to drive the driven gear affixed to the driven shaft and to be engaged by a series of controlling gears normally freely rotatable with means for selectively holding of the controlling gears for transmitting of the motion with varied gearing ratio; to provide an improved hydraulic gearing pump retarding means for the controlling gears adapted to effect low, and intermediate or second gearing relations, means to effect the reverse gearing relation and a simplified governor controlled clutch means incorporated therewith and operative to effect a direct drive condition responsive to a slight release of the accelerator pedal when the car has attained a given speed and which will be operable reversely, automatically under idling to change to low gear drive when the speed of the car becomes less than a predetermined speed; to provide for operating normally from a low gearing ratio to direct drive or high gear with provision for manually effecting an intermediate or second gear driving condition when desired and to provide for a hydraulic braking effect at high speed responsive to release of the accelerator pedal thus adding to the safety factor in driving.

The foregoing and other features and advantages of my present improvements will be more fully understood by reference to the accompanying drawings wherein the corresponding reference characters of this description are applied to the like parts in the several views.

Referring to the drawings,

Fig. 1 is a central, vertical sectional view of a transmission mechanism embodying the features of my invention.

Fig. 2 is a cross sectional view thereof on line $x$—$x$ showing the hydraulic retarding means for low gear.

Fig. 3 is a similar view taken on line $y$—$y$ showing the hydraulic retarding means for intermediate or second gear.

Fig. 4 is a detail cross sectional view on line showing the governor controlled clutch for effecting direct drive.

Figs. 5 and 6 are detail sectional views showing the braking means for the reverse control gear.

Fig. 7 is a detail sectional view of the operating connections from the accelerator pedal to the valve of the low hydraulic retarding means.

In the approved embodiment of the features of the present invention as here shown, 1 indicates the power or driving shaft which may be the crank shaft of an internal combustion motor of an automobile to be driven thereby. To an integral flange 2 on the drive shaft there is affixed by bolt 3 a gear housing 4 having counter shafts 6 upon which are journalled multiple drive gear members $d$. The gear members $d$ are formed with the gears 7, 8, 9 and 10, each of different diameter as shown. At 5 is indicated a rear plate for the gear housing 4. The housing 4 acts as a fly wheel affixed to the drive shaft 1 and with the oppositely positioned gear members $d$ constitutes the driving means of a planetary type transmission also including the driven or transmission gear $t$ affixed to transmission or driven shaft 12 in mesh with gear 7 and journalled control gears $l$, $i$ and $r$ in mesh with gears 8, 9 and 10 respectively for low, intermediate and reverse drive; the control gears $l$, $i$ and $r$ being normally freely rotatable and being selectively retarded or held to produce the determined driving gear ratio effected upon the translatory movement of the drive gear member $d$ which, with an epi-cyclic action transmits motion to the gear $t$ corresponding to the gearing ratio of the gearing train then effective. The driven or transmission shaft 12 is journalled at its forward end in the gear housing 4 and at its rear end in the transmission housing 20. The low gear control gear $l$ is journalled on the driven shaft 12 and has an integral sleeve 14 extending reversely thereof and having keyed thereon a gear 21 of a gear pump control device adapted to hold the gear $l$ for low gear drive and at its rear end has keyed thereon a member 72 of a clutch device adapted to couple the gear $l$ and the driven shaft for direct drive as hereinafter described. The intermediate control gear $i$ is provided with a sleeve 15 journalled on sleeve 14 and having keyed on its rearward end a gear 57 of a gear pump control or holding means and the reverse gear $r$ is keyed upon a sleeve 16 of a brake drum 17, journalled on the sleeve 15, and adapted to be held against rotation for reverse drive.

Controlling means

The controlling means for the low and second gear control gears $l$ and $i$ are of hydraulic or oil gear pump type and are positioned with an oil compartment formed between the cross partitions 19—19 of the housing.

Low gear

The gear pump controlling means for low gear drive consists of a casing rigidly secured within the housing and composed of a chambered casing member 25 having a bearing plate member 24 bolted thereto; member 25 having circular recesses closely fitting the gear 21 keyed on sleeve 14 and a co-acting gear 22 journalled on shaft 23 supported by the casing members.

As best shown in Fig. 2, the casing member 25 is formed with an upper horizontal air passage 35 communicating at its opposite ends with vertical passages 30, 39. These vertical passages are connected by central horizontal passages 31—40 communicating with the circular gear recesses within the gears. The meshing gears have a close fit. The lower end of the vertical passage 39 communicates with the oil reservoir as indicated and is provided with a ball valve 42 and at the opposite side of the gears the chamber casing member is provided with a similar vertical passage 32 provided with one way ball valve 33—34, thereby providing for oil intake at each side of the device. The gear casing member 25 is provided with a discharge opening communicating with the vertical passage 30 and provided with an adjustable plug 26 having a tapered opening adapted to govern the rate of discharge from the passage. The vertical passage 30 also has fitted thereto a vertical, movable valve member 27 having reduced portion 28 and a lower portion 29 and this valve 27, for controlling the action of the gear pump retard for low gear, is suitably connected to the usual accelerator pedal for controlling the driving motor. The connections therefore, as best shown in Fig. 7, comprise a suitably fulcrumed bell crank lever 43—44, member 43 of which is pivotally connected to the valve 27 and the arm 44 is pivotally connected by rod 45 to lever 46 integral with the accelerator pedal 47, pivotally supported upon rod 48 as shown. The rod 45 is forwardly extended through a bracket 49 and provided with a fixed collar 50 between which and the bracket a coil spring 51 is confined. The chamber casing member 25 has formed therein a bleeder opening 41 communicating with the lower portion of passage 39 and with a similar opening 41' from oil intake passage 32 to the lower open end of vertical passage 30.

Second gear retard

The generally similar hydraulic retarding device is employed for holding or retarding the condition for sleeve 15 and its gear $i$ to effect the condition for second or intermediate gear drive. In similar arrangement, the retarding device is composed of a chamber casing member 55 and bolted thereto a bearing plate 56. The member 55 is chambered to receive the gear 57 keyed on sleeve 15 and to receive the similar gear 58 meshing with gear 57 and journalled on counter shaft 58'. The operation of the second gear retard is controlled by valve plunger 59 operating to close horizontal air passage 60; the valve plunger operating within a vertical bore 61. The passage 60 is formed in the chamber casing member 55 and connects opposite vertical passages 62 fitted at their lower or oil intake ends with ball valves 63 as shown. The vertical passages 62 are connected by central horizontal passage 62' communicating through the gear chambers. The vertical passages 62 are connected to the oil reservoir above the valve 63 by the bleeder openings or reduced passages 41. The second gear control valve 59 is vertically reciprocated for opening and closing the air passage 60 by means of a bell crank lever 64, suitably fulcrumed and provided with a roller 65 engaged by an actuating slide 66, pivotally connected to a vertical lever 67, fulcrumed at 67' and pivotally connected at its upper end at 68 to a shifting slide 70 extending through an aperture in the dashboard 71 and provided with a retaining detent 69.

Reverse drive retard

For retarding and holding the sleeve 16 carrying the reverse gear $r$ the sleeve is provided as shown with an integral braking drum 17 surrounded by the usual flexible brake band 18 having a fixed end secured to a bracket 149 of the housing and having its free end perforated to receive an operating rod 145 which, as will be readily understood, may be operated from a foot pedal 146 as shown in Fig. 5. The rod 145 is provided with a fixed collar 148 engaging the free end of the brake band for compressing it upon the drum against the influence of a return spring 147 surrounding the rod and confined between the ends of the band.

Direct drive

To effect the operating condition for direct drive or high gear operation of the vehicle, provision is made for rotatively connecting the driven shaft 12 and the low gear drive sleeve 14 so that a positive drive is effected without planetation of the gearing. For this purpose the sleeve 14 is rearwardly extended and has keyed thereon a drum member 72 formed on its outer surface with brackets 73 upon which are fulcrumed governor levers 74 pivoted at 75 and provided with the weight 76. The governor levers 74 are positioned to engage a disc 83 formed with a sleeve 82 journalled upon a sleeve 79 of a clutch member 84 which is slidably keyed by means of keys 78 to the driven shaft 12. At its rearward end the sleeve 79 has threaded thereon a collar 80 and between it and a loose collar 81 a thrust bearing is provided and likewise interposed between the disc 83 and the clutch member 84 there is a ball thrust bearing. The clutch member 84 as best shown in Fig. 4, is provided with peripheral cam surfaces for inclined notches within which are received ball clutch members 86' retained in position by means of the opposite discs 85 having inturned marginal portions and secured to the opposite faces of the member 84. The shifting sleeve 82, engaged by the governor arm 74, is also engaged by a fork of a lever 87, fulcrumed at 88 and having an upper arm 89 and a second arm 91 to which is connected a spring 92 attached to bracket 93 and operative normally to influence the movement of the sleeve 82 and clutch member toward the right as shown. The arm 89 is provided with a shoulder or roller 90 positioned to be engaged by a shoulder 66' on the rear end of the actuating slide 66.

Operation

In the operation of my improved transmission, the motor is started in the usual way and at normal or idling speed the respective sleeves 14, 15 and 16 are not retarded and are therefore freely rotatable whereby the gearing planetates without transmission of motion to the driven shaft 12, so that an idling condition prevails. In the drawings all of the parts, valves and levers are shown in the idling position; the controlling valves 27 and 59 of the gear pump retarding device being open, thus establishing a cycle of air under which no oil is taken up by the gears other than from seepage for lubrication. During idling the motor and fly wheel gear housing 4 rotate counter clockwise and the driving gear member d has a translatory movement about the axis of shaft 1 in a clockwise direction with rotation about counter shaft 6, as will be understood. The pump gear 21 on sleeve 14 and all parts keyed to said sleeve, rotate in a clockwise direction.

Low gear

Upon depressing the accelerator pedal 47, the motor is speeded up and the control valve 27 is depressed and closes the air intake 26 of the low gear retarding devise, as a result of which, by reason of closing of the air cycle, the oil will enter the gear pump through passage 32 then passing through the central passage 31 around the gears 21 and 22 and from passage 40 upwardly through passage 39 closing a tapered valve 36 having plunger 37 and weight 38 positioned at the upper end of the passage 39. The discharge of the oil will then be through the bleeder opening 41 only. In consequence the gears 21 and 22 are retarded to produce a corresponding retarding or holding of the sleeve 14 and its associated gear l and the power is then transmitted to the driven shaft 12 as established by the gearing ratio between gears l, 8, 7 and t. As will be understood, the pump gears 21 and 22 rotate very slowly under this low gear drive condition. At this time the retarding device for second gear is idling.

High or direct drive

The high or direct drive operation is effected by means of the governor control ball clutch members 84—72 and is operable within a range of speed of low gear operation determined by the centrifugal action of the governor weights 76 with a setting to operate at a speed of about 15 miles or over the governor weight 76 will move outwardly and the lever 74 will correspondingly shift the ball clutch member 84 to the left and thereby position the balls 86' within the drum 72 in position to effect coupling of the driven snaft and the sleeve 14 for a direct drive. This is effected upon releasing of the accelerator pedal allowing the motor to slow down while the driven shaft 12 and the gear t maintain its momentum causing the gear l and the sleeve 14 to rotate in advance of the shaft 12, the cam surface of the ball of the ball clutch member 84 at this time allowing the relative movement of the shaft and sleeve as will be understood. Upon this releasing of the accelerator 47, the control valve 27 moves upward. The port 26 now becomes a discharge as the pump gear 21 now rotates in counter clockwise direction. The air channel 35 is closed by the valve 27 and oil suction now takes place through the intake 42. The discharge plug 26 is adjusted to permit gear 21 to rotate in advance of shaft 12 up to about 25 miles per hour. At a speed above 25 miles per hour the discharge capacity at this port is below the pump capacity, thereby causing the retarding or braking effect on the gears 21 and 22. By again depressing the accelerator pedal 47, the motor and the gear casing 4 speed up. Sleeve 14 ceases to rotate in advance and tends to rotate in opposite direction of shaft 12. This is prevented by the one way clutch 72—84, thus locking the sleeve 14 and the driven shaft 12 together. The direct drive or high gear operation is then established and now the gear pump is idling with the air channel 35 and valve 36 open acting as an intake and bleeder 41' discharging air.

Second gear ascending

In high gear operation the lever 89—91 has moved backward under the influence of the governor weight 76 and as shown in dotted lines in Fig. 1 with the roller 90 of said lever resting against the shoulder 66'. By shifting in second, which is usually done at a speed below 25 miles per hour, the gas pedal is released, the motor slows down, sleeves 14, 15 and all parts in connection with said sleeves, rotate in advance of driven shaft 12. So does the drum 72. The ball clutch is now disengaged. The knob 70 on dashboard 71 is pulled out so detent 69 will rest against dashboard 71. This will move bar 66 forwardly thereby disengaging ball disc d4 from drum 72 by means of the engagement between roller 90 and shoulder 66'. At the same time lever 64 supported by bracket and resting in notch 65 moves plunger 59 downward. The air circulation in channel 60, 62 is now interrupted. After pulling out knob 70, the gas pedal is again depressed and the motor gains speed. When motor speed and the speed of shaft 12 synchronize, sleeves 14 and 15 rotate at a slower rate and sleeve 15 finally tends to rotate in opposite direction to the driven shaft 12. At this time suction through channel 63 (Fig. 3) opens and oil is pumped from the left to the right side of gear pumps 55. The pump gears 57, 58 are practically held against rotation as very little oil can pass through the bleeder 41. The drive is thus in second, while sleeve 14 and its related parts rotate now in the direction of the driven shaft at a slower rate of speed.

From second to high

This is accomplished by releasing the gas pedal, slightly pushing the knob 70 forward and again depressing the accelerator. The forward movement of the knob 70 moves bar 66 backwardly, releasing the lever 89. The governor weights 76 are now free to spread again and to shift the clutch disc 84 within drum 72. By this action the plunger 59 (Fig. 3) is first raised, air is taken in through hole 61 and oil level in pump drops through bleeder 41—41' below meshline and upon depressing of the accelerator pedal again, the ball 86' of the one way clutch couple the drum 72 and driven shaft and the drive is back in high gear.

Second gear descending

This is attained under the same action as in ascending. The mechanism acts the same also, except the action in pump 55 (Fig. 3). Upon releasing of the gas pedal, the pump gear 57 will rotate in advance of shaft 12. With the knob 70 pulled out and the channel 60 closed, the suction is now through valve 63' and discharge through bleeder 41'. Since there is almost no discharge, the pump gears 57, 58 are nearly stopped and therefore the motor rotates in advance of shaft 12 in accordance with the difference in the diameters of the gears i, 9 and 7, t. The sleeve 14 and its parts now rotate much slower in the direction of shaft 12 and the low gear control pumps (Fig. 2) has no effect on the drive as air is being pumped and discharged by slot in plug 26. Air intake channel 35 is always closed, whenever gas pedal is fully released.

From second descending into high

When the car is going down hill in second and it is desired to change to high, the knob 70 is pushed in releasing the governor as described and opening the air intake 61 and circulating channel 60, 62 so that oil drops to normal level. Instantly upon releasing of the pressure in the gear pump, the advance rotation of the motor drops, while both of the sleeves 14 and 15 rotate in advance of driven shaft 12. If the speed of the shaft 12 is equal to 25 miles per hour car speed, the sleeve 14 cannot rotate in advance of said shaft, for the volume of oil pumped will be too great to pass through the plug 26. Therefore the motor has to rotate in unison with shaft 3. This will give at high speed a substantial braking effect. It will be understood that the drive changes into high the moment the knob 70 is pushed forward. There is more or less braking effect by the gear pump of Fig. 2 dependent on the speed of the car as already explained. By depressing the gas pedal again said braking resistance is eliminated and drive is again in high.

Stopping of car

Upon releasing of the accelerator pedal 47, the motor slows down to an extent dependent on oil discharge through plug 26. Since the valve plunger 27—29 always operates with the gas pedal, the low gear pump (Fig. 2) is again active. The speed of car is accordingly retarded by the restricted discharge 26. This brake power diminishes at a car speed below 25 miles per hour. By using the foot brake the car is brought to a full stop. During the above procedure the sleeve 14 will rotate in advance of shaft 12 at a speed of less than 25 miles per hour. The balls 86' disengage from the drum 72, while the governor weights are still in outward position. As heretofore stated, said weights move outward at a speed of 15 miles per hour and will move back at a lower speed of about 7 miles per hour, according to centrifugal formulas and depending on the radius of weights at resting position and radius of weights in action. However, the differences of both radii should be very small, which means that the lever with weights 76 should be as short as possible. The centrifugal force has to diminish sufficiently before shaft 12 rotates below idling speed of motor. The spring 92 then pulls all sliding parts in idling position as shown in Fig. 1. Sleeve 14 rotates in advance of driven shaft 12 as long as shaft 12 turns in advance of fly wheel 4. The instant shafts 1 and 12 are synchronized sleeve 14 is also synchronized. Before the car comes to a full stop, the shaft 14 will again rotate clockwise and the transmission is in neutral with the gear pump retards idling.

Reverse drive

This is obtained by depressing the pedal 146 operating the brake band 18 to hold the drum 17 (Figs. 1 and 5). Upon slightly depressing the gas pedal 47, the reverse pedal is depressed, thus applying band 18 to drum 17. The counter clockwise rotation of said drum is stopped and the drive is in reverse. Upon releasing the reverse pedal and depressing the gas pedal more, the reverse motion of car is stopped and forward drive introduced or upon releasing both pedals, the transmission is in neutral.

As shown, the plug 26 having tapered opening is formed as a spring pressed discharge plunger 27 with tapered slot. Between plunger 27, rod 28 and piston 29 there is at certain times a very high oil pressure. The plungers 29, 27 balance said pressure and may be moved without noticeable resistance on the accelerator or gas pedal.

Having described my invention, I claim:

1. A transmission mechanism comprising a drive shaft and a driven shaft in axial alignment therewith, a gear carrier member on the drive shaft, a transmission gear on the driven shaft, a multiple drive gear member journalled in the carrier member, a series of varied size control gears journalled to be normally freely rotatable, said drive gear member having gears meshing with the control gears and a gear in mesh with the transmission gear, means for selectively retarding the rotation of the control gears to effect rotation of the driven gear responsive to epicyclic motion of the multiple drive gear as controlled by a retarded control gear, a governor controlled uni-directional clutch positioned to effect rotative coupling of the driven shaft and a low ratio control gear for direct drive.

2. A transmission mechanism having in combination with a motor and manually operable means for controlling the speed of the motor, of a drive shaft, a driven shaft, a gear carrier member rotatable with the drive shaft, a multiple drive gear member journalled in the carrier member, a gear on the driven shaft, a series of varied size control gears journalled to be normally freely rotatable, said drive gear member having gears meshing with the control gears and a gear in mesh with the driven shaft gear, means for selectively retarding the rotation of the control gears to effect rotation of the driven gear responsive to epicyclic motion of the multiple drive gear as controlled by a retarded gear and means operative to effect locking of the gearing against relative rotation for direct drive arranged to be responsive to release and subsequent advance of the manual motor operating means.

3. A transmission mechanism having in combination with a motor and manually operable means for controlling the speed of the motor, of a drive shaft, a driven shaft, in axial alignment therewith, a gear carrier member rotatable with the drive shaft, a multiple drive gear member journalled in the carrier member, a gear on the driven shaft, a series of varied size control gears journalled concentric with the driven shaft to be normally freely rotatable, said drive gear member having gears meshing with the control gears and a gear in mesh with the driven shaft gear, rotary fluid pumps connected for selectively retarding the rotation of the control gears to effect rotation of the driven gear responsive to epicyclic motion of the multiple drive gear as controlled by a retarded gear for low and intermediate drive ratio, manually operated valve means for the pumps and governor controlled clutch means operative to effect locking of the gearing against relative rotation for direct drive arranged to be responsive to release and subsequent advance of the manual motor operating means.

4. A transmission mechanism having in combination with a motor and manually operable means for controlling the speed of the motor, of a drive shaft, a driven shaft in axial alignment therewith, a gear carrier member rotatable with the drive shaft, a multiple drive gear member journalled in the carrier member, a gear fixed to the driven shaft, a series of varied size control gears journalled on the driven shaft, to be normally freely rotatable, said drive gear member having gears meshing with the control gears and a gear in mesh with the driven shaft gear, rotary fluid pump connected for selectively retarding the rotation of the control gears to effect rotation of the driven gear responsive to epicyclic motion of the multiple drive gear as controlled by a retarded gear for low and intermediate drive ratio, manually operable valve means for the pumps, governor controlled clutch means operative to effect locking of the gearing against relative rotation for direct drive arranged to be responsive to release and subsequent advance of the manual motor operating means and manually operated means for a control gear to effect reverse drive relation.

5. A transmission mechanism having in combination with a motor and manually operable means for controlling the speed of the motor, of a drive shaft, a driven shaft in axial alignment therewith, a gear carrier member rotatable with the drive shaft, a multiple drive gear member journalled in the carrier member, a transmission gear fixed on the driven shaft, a series of varied size control gears fixed on sleeves journalled concentric with the driven shaft, said drive gear member having gears meshing with the control gears and a gear in mesh with the driven shaft gear, a rotary fluid gear pump retarding device rotatively connected with a low drive ratio control gear and operable for retard in one direction only, a valve for controlling the action of the low ratio retarding device connected to be operable by the manual control means for the motor, a second fluid gear pump retarding device rotatively connected with an intermediate ratio control gear, a valve for controlling the action thereof and manually operable connections for actuating said valve to effect intermediate drive ratio and means operative to effect locking of the gearing against relative rotation for direct drive arranged to be responsible to release and subsequent advance of the manual motor operating means.

6. A transmission mechanism having in combination with a motor and manually operable means for controlling the speed of the motor, of a drive shaft, a driven shaft in axial alignment therewith, a gear carrier member rotatable with the drive shaft, a multiple drive gear member journalled in the carrier member, a transmission gear fixed on the driven shaft, a series of varied size control gears fixed on sleeves journalled concentric with the driven shaft, said drive gear member having gears meshing with the control gears and a gear in mesh with the driven shaft gear, a fluid gear pump retarding device rotatively connected with a low drive ratio control gear and operable for retard in one direction only, a valve for controlling the action of the low ratio retarding device connected to be operable with the manual control means for the motor, a second fluid gear pump retarding device rotatively connected with an intermediate ratio control gear, a valve for controlling the action thereof and manually operable connections for actuating said valve to effect intermediate drive ratio, a drum rotatably connected to a control gear for reverse drive, a secured brake band surrounding the drum, means for actuating the brake band and governor controlled clutch means operative to effect locking of the gearing against relative rotation for direct drive and arranged to be responsive to release and subsequent advance of the manual motor operating means, above a determined speed.

7. A transmission mechanism having in combination with a motor and manually operable means for controlling the speed of the motor, of a drive shaft, a driven shaft in axial alignment therewith, a gear carrier member rotatable with the drive shaft, a multiple drive gear member journalled in the carrier member, a transmission gear on the driven shaft, a series of varied size control gears fixed on sleeves journalled concentric with the driven shaft, said drive gear member having gears meshing with the control gears and a gear in mesh with the driven shaft gear, a rotary fluid gear pump retarding device rotatively connected with a low drive ratio control gear and operable for retard in one direction only and having a yieldable discharge valve, a valve for controlling the action of the low ratio retarding device connected to be operable with the manual control means for the motor, a second fluid gear pump retarding device rotatively connected with an intermediate ratio control gear, a valve for controlling the action thereof and manually operable connections for actuating said valve to effect intermediate drive ratio and means operative to effect locking of the gearing against relative rotation for direct drive arranged to be responsive to release and subsequent advance of the manual motor operating means consisting of a drum on the low ratio gear sleeve, a radial cam clutch member slidably keyed on the driven shaft, governor weights carried by the drum and having arms engaging the cam clutch member, balls carried by the cam clutch member and spring actuated means operative normally to move the clutch member to inoperative position.

8. A transmission mechanism having in combination with a motor and manually operable means for controlling the speed of the motor, of a drive shaft, a driven shaft, a gear carrier member rotatable with the drive shaft, a multiple drive gear member journalled in the carrier member, a gear on the driven shaft, a series of varied size control gears journalled to be normally freely rotatable, said drive gear member having gears meshing with the control gears and a gear in mesh with the driven shaft gear, means for selectively retarding the rotation of the control gears to effect rotation of the driven gear responsive to epicyclic motion of the multiple drive gear as controlled by a retarded gear and means operative to effect locking of the gearing against relative rotation for direct drive arranged to be responsive to release and subsequent advance of the manual motor operating means consisting of a drum journalled on the driven shaft and connected to a low ratio control gear, a cam clutch member slidably keyed on the driven shaft to be movable into and out of operating relation to the drum, governor weights carried by the drum and engaging the clutch member and means normally to shift the clutch member out of operating position.

9. A transmission mechanism having in combination with a motor and manually operable means for controlling the speed of the motor, of a drive shaft, a driven shaft in axial alignment therewith, a gear carrier member rotatable with the drive shaft, a multiple drive gear member journalled in the carrier member, a transmission gear on the driven shaft, a series of varied size control gears fixed on sleeves journalled concentric with the driven shaft, said drive gear member having gears meshing with the control gears and a gear in mesh with the driven shaft gear, a rotary gear pump retarding device rotatively connected with a low drive ratio control gear and operable for retard in one direction only, a valve for controlling the action of the low ratio retarding device connected to be operable with the manual control means for the motor, a second fluid gear pump retarding device rotatively connected with an intermediate ratio control gear, a valve for controlling the action thereof and manually operable connections for actuating said valve to effect intermediate drive ratio and governor controlled clutch means operative to effect locking of the gearing against relative rotation for direct drive arranged to be responsive to release and subsequent advance of the manual motor operating means, means operative normally to shift the clutch to inoperative position and engaging means between the connections for actuating the intermediate ratio control valve and the clutch shifting means to render the clutch inoperative during intermediate drive.

10. A transmission mechanism having in combination with a motor and manually operable means for controlling the speed of the motor, of a drive shaft, a driven shaft in axial alignment therewith, a gear carrier member rotatable with the drive shaft, a multiple drive gear member journalled in the carrier member, a transmission gear on the driven shaft, a series of varied size control gears fixed on sleeves journalled concentric with the driven shaft, said drive gear member having gears meshing with the control gears and a gear in mesh with the driven shaft gear, a rotary fluid pump retarding device rotatively connected with a low drive ratio control gear and operable for retard in one direction only, said retard device having rotors, vertical passages at each side of the rotors, a central passage connecting the vertical passages, a discharge port from one of the vertical passages and a slide valve fitted in said passage and formed with a reduced portion adapted to establish communication with the central passage from the discharge port while closing the passage above and below for balancing of the pressures, said valve being connected to be operable by the manual control means for the motor.

KARL JOSEF STRIGL.